United States Patent Office 3,524,723
Patented Aug. 18, 1970

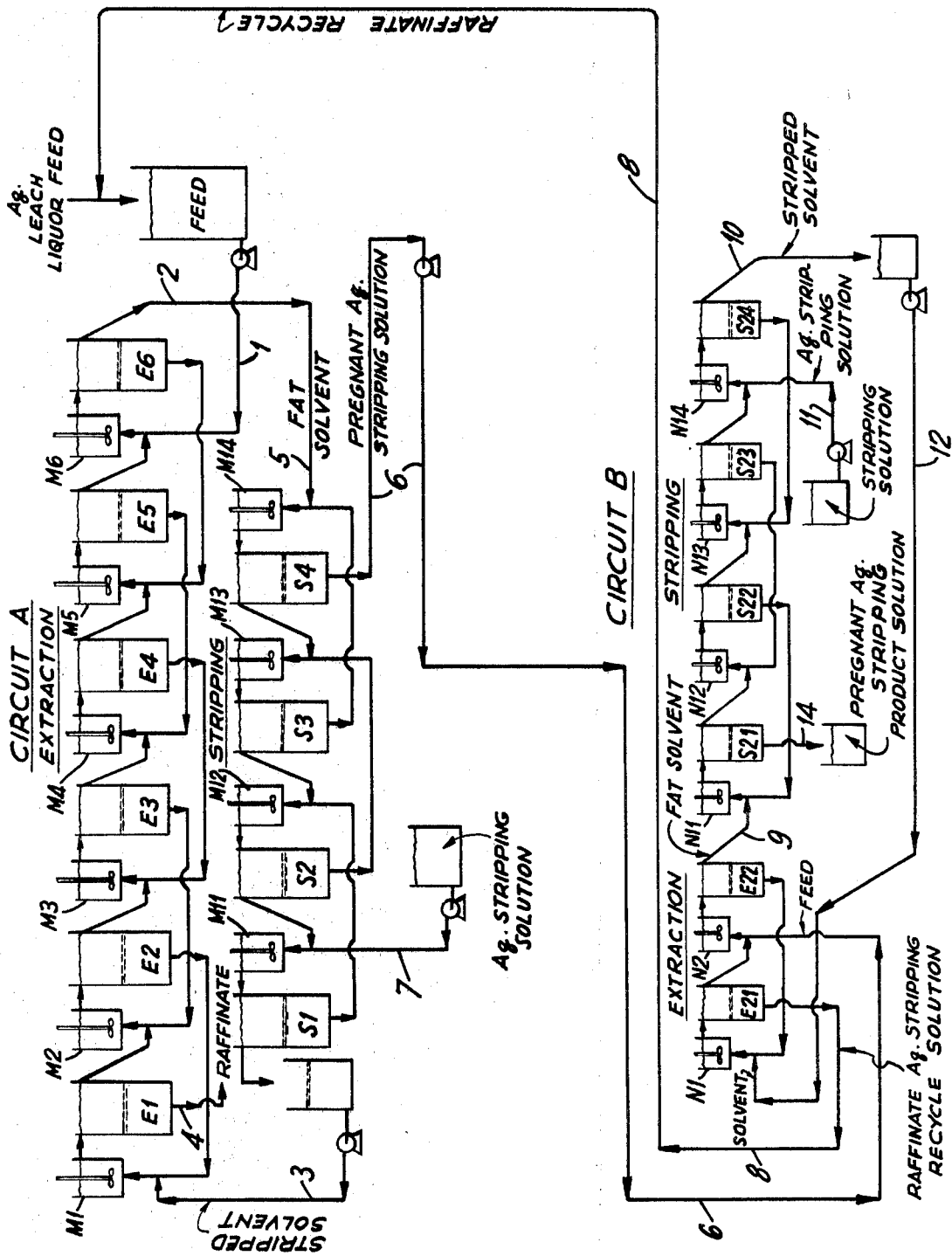

3,524,723
SOLVENT EXTRACTION PROCESS FOR SEPARATING EUROPIUM FROM OTHER RARE EARTHS
Wayne A. Millsap, Arvada, and Hal D. Peterson, Boulder, Colo., assignors to Molybdenum Corporation of America, New York, N.Y., a corporation of Delaware
Filed Jan. 10, 1966, Ser. No. 519,793
Int. Cl. C22b 59/00
U.S. Cl. 23—22                                   2 Claims

ABSTRACT OF THE DISCLOSURE

This invention provides a process for selectively separating europium values from an aqueous feed solution containing europium and other rare earth values. The process comprises feeding the aqueous solution to a solvent extraction circuit, contacting the aqueous feed solution with an organic alkyl phosphate solvent which is immiscible with water and which preferentially extracts substantially all of the europium values and a minor amount of the other rare earth values, separating an aqueous phase substantially devoid of the europium values from a solvent phase enriched in the europium values, contacting the separated solvent phase enriched in the europium values with an aqueous acid stripping solution and stripping substantially all of the europium and other rare earth values from the solvent into the stripping solution and separating a solvent phase substantially devoid of the europium values from an aqueous phase enriched in the europium values and recovering the aqueous stripping solution substantially enriched in the europium values.

---

The present invention relates to a process for solvent extraction of europium from solutions of rare earth elements. The present invention specifically relates to a process for concentrating europium by fractionation of a rate earth solution by solvent extraction. More particularly, the present invention relates to a novel two circuit interlocked solvent extraction and stripping process for the recovery of europium.

More specifically, the present invention relates to a process for recovering europium from rare earth concentrates obtained by acid leaching of bastnasite rare earth ore concentrates. The leach liquor concentrate feed is subjected to an organic solvent extraction step using a solvent relatively selective for europium and relatively non-selective for most other rare earth elements present. The solvent containing the rare earths extracted from the leach liquor is contacted with an aqueous stripping solution. The stripping solution strips the rare earths from the solvent and the stripping solution containing the europium and rare earths is then fed to the second solvent extraction circuit.

The organic solvent in the second solvent extraction circuit extracts europium from the stripping solution together with a relatively minor amount of other rare earths. The organic solvent containing the extracted europium and other rare earths is contacted with a second stripping solution which solution strips europium and other rare earths from the solvent. The second stripping solution contains a relatively high concentration of europium to other rare earths and is the product of the process. The aqueous raffinate solution from the feed to the second solvent extraction circuit is recycled and combined with the feed solution to the first solvent extraction circuit.

The process of the present invention has particular application in the recovery of europium from predominately cerium group rare earth concentrates in which the europium comprises only a minor portion of the total rare earth content of the concentrates. The process of the present invention produces an aqueous solution concentrated in europium oxide.

The term rare earths as it is used in the present specification includes lanthanide rare earth elements having atomic numbers 57 to 71 inclusive and the element yttrium, atomic number 39, which is ordinarily found in rare earth concentrates and acts similarly to the rare earths in chemical separations.

The rare earths are usually obtained from ore concentrates of their oxides. Until recent years the rare earth oxides were separated into their individual components by the method of fractional crystallization or by the use of cation exchange resins.

Because of the close chemical similarity of the rare earths the fractional crystallization procedure is a very laborious task and it is extremely difficult to obtain even comparatively pure individual rare earth elements by this method. The use of cation exchange resins on the other hand is a very slow and expensive expedient requiring relatively large investment and resulting in recovery of only very small amounts of individual relatively pure rare earth elements.

Certain organic solvent systems have been found which will extract rare earth elements from aqueous concentrates of rare earths.

The solvents generally show a solvent capacity for the rare earths depending on their atomic weight or number. With some solvents the higher the atomic number, the relatively more of that particular rare earth element that is solvent extracted while other solvents exhibit a selectivity for the lower atomic number rare earths. When a rare earth concentrate is contacted with a solvent the concentration of the various rare earth ions in the extracting solvent automatically adjust to a concentration generally depending on its atomic weight.

The rare earths are present, for example, in aqueous leach liquor concentrates in widely varying amounts depending on the source of the concentrate. Some of the rare earths are present in very small amounts such as europium, e.g. 0.2% by weight of total rare earths, others such as cerium lanthanum, neodymium, and yttrium, may be present in amounts of up to 50% by weight of total rare earths.

Europium has become very useful for many commercial applications. Rapid development of industrial applications, however, has been forestalled by the inability of the industry to develop processes and techniques which would make europium available in relatively pure form and in large quantities. Rare earth concentrates containing 6% to 10% by weight of europium based on total rare earths or 10 to 30 gm./l. of europium can be treated by known chemical procedures to recover substantially pure europium. The problem has been, how to increase the concentration of europium from about 0.2% by weight of total rare earths as present in leach liquor concentrates to 6% to 10% by weight. Another problem has been, how to recover the europium without loss of substantial amounts of the europium present. Presently known techniques used to recover europium result in recovering only about 50% of the europium present in the ore concentrate.

Various solvents and solvent extraction techniques have been tried to selectively extract rare earth elements from other rare earth elements, but due to the very close chemical characteristics of the rare earth elements the difficulty of separating one particular element from another has been likened to the difficulty of separating different isotopes of elements from each other.

With particular rare earth elements such as europium, a particular solvent may be found which may be selective to europium. It is found, however, that in the presence of other elements that the extraction of europium is not quantative and though the europium may be selectively extracted, a substantial portion of the europium present and available for recovery is lost. On the other hand, solvents which would quantatively extract substantially all of the europium are non-selective and though substantially all the europium is extracted from a particular rare earth concentrate solution treated, there is such a large percentage of the closely related rare earth elements also extracted that there is relatively little advantage gained in the extraction procedure used insofar as increasing the relative concentration of europium.

In accordance with applicants' two circuit interlocked solvent extraction process europium can be efficiently recovered from, for example, a leach liquor concentrate obtained by acid leaching a bastanasite ore concentrate.

Applicants have unexpectedly found that recycle of the raffinate feed from the second extraction to the feed of the first extraction step improved selectivity without degrading recovery in the first extraction step.

In accordance with the present invention europium is quantitively recovered in a first extraction step and qualitively recovered in a second extraction step using the same solvent to recover 80% or more of europium present. The concentrated products of the present invention can be treated by conventional techniques to recover pure europium.

Further, it was heretofore believed undesirable to use two solvent extraction circuits because it would result in higher overall europium loss and also, because it was thought that the ratio of europium to rare earth recovered would not be significantly altered because of the europium loading characteristics of the solvent.

It was also unexpectedly found that by increasing the europium concentration in the aqueous feed solution to the second extraction step that the relative amount of europium extracted is over and above that which would normally be expected from the known solubility distribution curve for a DEHPA type solvent for a mixture of the rare earths treated.

In accordance with the present invention the europium is recovered by fractional solvent extraction from an aqueous solution of rare earth concentrate. A novel two circuit interlocked fractional solvent extraction system is used. This system consist of a first solvent extraction Circuit A which extracts substantially all the europium and some of the other rare earths from the concentrate and produces a fat organic solvent containing rare earth metals. The fat organic solvent is then stripped of substantially all of the rare earths extracted by contact with an aqueous inorganic acid stripping solution.

The pregnant aqueous stripping solution is the feed to the second solvent extraction Circuit B. Circuit B further purifies and concentrates the europium. In Circuit B the pregnant aqueous stripping solution from the Circuit A is contacted with an organic solvent which extracts only part of the europium and only part of the other rare earth elements. The raffinate solution resulting from contact with organic solvent in Circuit B contains a substantial amount of europium and is recycled and mixed with an aqueous concentrate solution feed fed to the extraction step of Circuit A.

The fat organic solvent from Circuit B extraction step is subsequently contacted with a second aqueous inorganic acid stripping solution which strips substantially all of the europium and rare earth elements from the organic solvent. The pregnant stripping solution from Circuit B is the product of the process.

By carrying out the process of the present invention wherein the aqueous raffinate of the feed solution resulting from contact with organic solvent in Circuit B is recycled to the aqueous concentrated feed solution to the extraction step of Circuit A it was unexpectedly found that there is no reduction in the amount of europium extracted and there is a substantial reduction in the amount of other rare earths extracted.

Applicants also unexpectedly found that by increasing the amount of the europium concentration in the feed to Circuit B, above the theoretical maximum the solvent would extract, that greater selectivity could be obtained for europium in Circuit B and substantially greater loading achieved than was heretofore believed possible.

It was further unexpectedly found that the same solvent could be used by following the process of the present invention to quantatively and qualitively extract and recover europium from rare earth concentrates.

The primary source of rare earth concentrates are rare earths containing ores such as monazite sands and bastnasite ores and rare earth containing fluorcarbonate residues and concentrates.

In a preferred embodiment of the present invention the source of the rare earths containing concentrates is mineral bastnasite which is essentially a rare earth fluorcarbonate and ores and residues rich in bastnasite and/or cerium group rare earth fluorcarbonates. There are various bastnasite type ores which differ in their rare earth composition and the percentage of the various rare earth in the composition. An illustrative bastnasite type ore would have the following approximate percentage composition:

| | Weight percent |
|---|---|
| Carbonates | 20–40 |
| Silica | 15–25 |
| Lime | 2–30 |
| Rare earth compounds | 5–50 |
| Iron oxide | 1–5 |
| Aluminum oxide | 1–5 |

The rare earth constituents of the ore can be concentrated in a conventional manner by grinding and flotation or other gravity processes to obtain an ore concentrate containing 60% by weight of rare earths. The ore concentrate is generally subjected to a conventional roasting operation to decompose the carbonates, release carbon dioxide and convert the rare earth carbonates to rare earth oxides. The aqueous leach liquor concentrate of the rare earths can be obtained by one or more acid leaching steps whereby substantially all the rare earths present in the ore concentrate are extracted into the aqueous inorganic acid leach liquor solution. A suitable extraction or leaching acid is hydrochloric acid.

The rare earth group metals have consecutive atomic numbers and are very similar in chemical and physical properties which has heretofore made it practically impossible to obtain one or more specific rare earth compounds in relatively pure form in large amounts from the rare earth ores and/or the aqueous leach liquor concentrates.

In accordance with a preferred embodiment of the present invention, the europium is extracted from the leach liquor concentrate by using specific types of alkyl organic phosphoric acid solvents. The solvent may contain one of two alkyl groups. The alkyl may be normal or branched chain and contain 4 to 12 carbon atoms. A solvent that has proved particularly effective in recovery of europium is di-(2-ethylhexyl) phosphoric acid, hereinafter referred to as DEHPA. However, depending on the concentrations of the various rare earth elements in the particular feed and the separation that is to be carried out other solvents can be used that exhibit a characteristic selectivity for the rare earth metal to be concentrated and recovered.

The preferred alkyl organic phosphoric acids used in the process of the invention have a relatively high viscosity and are therefore normally used in diluted form so that handling and phase separation are facilitated. Suitable diluents are aromatic hydrocarbon solvents, e.g. benzene, toluene and xylene; aliphatic hydrocarbon solvents, e.g. middle distillate aliphatic hydrocarbons and kerosene. A preferred diluent is kerosene having a boiling range of 150°–280° C.

Various additives may be added such as surfactants, dispersing and wetting agents that are soluble in the diluent and in the organic phosphate solvent which aid in phase separation. The additives are selected so that they do not adversely affect the selectivity of the organic phosphate solvent for europium. A suitable additive is tributyl phosphate.

Inorganic mineral acids may be used in the stripping solutions. Mineral acids such as nitric, sulfuric, hydrogen halide acids, such as hydrogen chloride, hydrogen bromide and hydrogen iodide can be used. The preferred acid is hydrochloric acid.

The process of the present invention comprises a two circuit interlocked solvent extraction system. The process can be carried out batchwise or continuously. The extraction and stripping steps are preferably carried out countercurrently.

The amount of europium oxide as well as the amount of other rare earth oxides present in the solution being treated to selectively recover europium will vary with the source of the rare earth materials. Generally, aqueous leach liquor concentrates obtained from acid leaching of roasted bastnasite ores are used as feed solutions. These solutions can contain 0.05 to 1.0 gram per liter of europium oxide, more generally 0.1 to 0.5 gram per liter and preferably 0.20 to 0.25 gram per liter of europium oxide.

The other rare earth oxide elements can be present in concentrations of 75 to 300 grams per liter, more generally 80–250 grams per liter and preferably 100–175 grams per liter.

The concentrations of the rare earth oxides in grams per liter can be altered by dilution or evaporation to obtain the optimum process concentration. Generally, it is preferred to process a solution as concentrated as possible constituent with maximum europium recovery.

Feed solutions containing as little as 0.05% by weight of europium oxide based on weight of total rare earth oxides can be processed. More generally, the feeds will contain 0.01 to 0.5% by weight of europium oxide and preferably 0.1 to 0.3% by weight of europium oxide. These percentages correspond to .5 to 5 parts per thousand and 1 to 3 parts per thousand of europium oxide based on total weight of rare earth oxides present. The term $Eu_2O_3$ is used to represent europium oxide, while $RE_2O_3$ is used to represent total rare earths. Where cerium oxide ($Ce_2O_3$) is specifically analyzed for the amount of cerium oxide present is also given.

In analyzing the various treating solutions the amounts of europium and rare earths present are given in terms of the europium oxide and rare earth oxides though they may be present in the various solutions as the corresponding salts, e.g. chlorides.

The leach liquor concentrate feed solution to Circuit A is adjusted by suitable means to have a pH of 1.0 to 4, more generally 1.0 to 3.0 and preferably 1.0 to 2.0. The feed solution is contacted with a sufficient amount of solvent solution for a sufficient period of time to carry out the desired extraction step.

The Circuit A solvent extraction step is carried out to extract substantially all of the europium present in the leach liquor feed solution, and to minimize the amounts of other rare earth materials extracted. Between 75% and 99% by weight of the europium present will be extracted, more generally between 85% and 99% will be extracted and preferably 90%–99% will be extracted.

The critical feature of this step is to extract substantially all of the europium oxide present in the leach liquor concentrate.

Only a relatively minor percent of the other rare earths are extracted in this step and the major portion of the other rare earths remain in the leach liquor feed raffinate solution.

The second step of the Circuit A extraction consists of stripping the fat solvent containing the extracted europium and other rare earths. The stripping solution may comprise an aqueous inorganic mineral acid solution having a concentration of acid of 1.0 to 5.0 N, more generally 2.0 to 4.0 N, and preferably 2.5 to 4.0 N. The stripping step is carried out to extract substantially all of the rare earths from the organic solvent. The stripped solvent is recycled and used to extract additional leach liquor feed.

The Circuit A extraction and stripping steps, depending on the number of extraction stages and stripping stages used will increase the concentration of europium oxide in grams per liter by a factor, based on equal volumes of aqueous solution, and based on europium in the feed solution measured as europium oxide (i.e. not counting recycle europium), two to six and more generally four to five; and will increase the relative percentage of europium measured as europium oxide to total rare earths measured as oxides by a factor of 5 to 15, generally 10 to 15 and more generally 8 to 12.

The Circuit A extraction substantially increases the relative amount of europium to total rare earths present in the extracted rare earths. The stripping solution containing the rare earth elements is referred to as the pregnant stripping solution.

The pregnant stripping solution is the feed to the Circuit B extraction step. The pH of the pregnant aqueous stripping solution feed is adjusted to a pH of 1.0 to 4.0, more generally 1.0 to 3.0, and preferably 1.0 to 2.0.

As in the previous solvent extraction step, i.e. of Circuit A, the solvent and aqueous feed solution are contacted and intimately mixed in a suitable mixer and allowed to settle in the settler and separate into an aqueous phase and an organic phase. The critical feature in this step is to carry out the extraction in such a manner that the europium is qualitatively extracted and only a minor portion of the other rare earths is extracted. The aqueous feed raffinate from the Circuit B extraction contains a substantial amount of europium and a substantial amount of other rare earths and in order not to lose the europium to the process the raffinate is recycled and added to the aqueous feed solution to the Circuit A extraction step. The Circuit B extraction step unlike the Circuit A extraction step is not carried out to extract substantially all of the $Eu_2O_3$, but to selectively extract the europium.

The Circuit B extraction step is carried out in such a manner as to extract 40%–80% by weight of the europium present in the feed solution to Circuit B, generally 45%–70% and preferably 50%–70%, while minimizing the amount of other rare earths extracted. The Circuit B extraction step substantially increases the concentration of europium in grams per liter as well as the percent concentration of europium based on total rare earths present.

The next process step consists of stripping the rare earths from the organic solvent into an aqueous stripping solution by countercurrently contacting the fat organic solvent with an aqueous inorganic mineral acid stripping solution. The stripping step is carried out in such a manner that substantially all of the europium and rare earths are stripped from the fat organic solvent and the stripped organic solvent is recycled to the extraction step of Circuit B.

In order to obtain complete stripping of the solvent the acid concentration of the stripping solution is carefully controlled. The acid concentration of the stripping solution can be 2.0 to 6.0 N, more generally 3.0 to 6.0 N, and preferably 4.0 to 5.0 N. The pregnant stripping solution contains substantially all the rare earths present in the solvent and comprises the product of the process. The stripped organic solvent is recycled to the Circuit B solvent extraction step.

The concentration of europium measured as europium oxide in grams per liter in the product stream, i.e. the pregnant stripping solution can be 1 to 30 gm./l., more generally 5 to 25 gm./l. and preferably 10 to 25 gm./l. The percent concentration of $Eu_2O_3$ relative to the amount of $RE_2O_3$, i.e. total rare earths present can be 5% to 25% by weight, generally 6% to 15% and more generally 7% to 15%.

The Circuit A solvent extraction step can be carried out by using 4 to 12 extraction stages. The stripping step of Circuit A can be carried out by using 2 to 8 stripping stages. Good results have been obtained with 4 stripping stages. The Circuit B extraction can be carried out by using 1 to 6 extraction stages, good results have been obtained by using two extraction stages and the stripping step of Circuit B can be carried out using 2 to 8 stripping stages, good results have been obtained with 4 stripping stages.

In accordance with a preferred embodiment of the present invention six countercurrent solvent extraction stages are used in Circuit A and four countercurrent stripping stages are used. In Circuit B, two countercurrent solvent extraction stages are used and four countercurrent stripping stages are used. The aqueous raffinate feed from the extraction step of Circuit B is recycled to the feed to the extraction step of Circuit A. The organic solvent used in the extraction steps of both Circuits A and B is di-(2-ethylhexyl) phosphoric acid. The aqueous inorganic mineral acid stripping solutions used in both Circuits A and B comprise hydrochloric acid. The preferred conditions used in each of the extraction and stripping steps are summarized below in Table I. The europium and total rare earths concentrations are given based on the corresponding oxides, e.i. for europium as europium oxide ($Eu_2O_3$) and total rare earths as the rare earth oxides ($RE_2O_3$).

TABLE I

Circuit A

Extraction:
  Leach liquor feed—
    $Eu_2O_3/RE_2O_3$, percent by weight ____ .1–.3
    $Eu_2O_3$, gm./l. _____ .2–.25
    $RE_2O_3$, gm./l. _____ 100–175
    pH of leach liquor concentrate _____ 1.0–2.0
    Percent $Eu_2O_3$ extracted _____ 90–99
Stripping:
  Conc. stripping sol. N _____ 2.5–4.0

Strips substantially all of the rare earths out of solvent.

Circuit B

Extraction.—Feed to Circuit B pregnant aqueous stripping solution from Circuit A:
  pH of feed solution _____ 1.0–2.0
  Percent $Eu_2O_3$ extracted _____ 50–70
Stripping:
  Conc. of acid stripping sol. N _____ 4.0–5.0
  Pregnant stripping solution—
    G./l. $Eu_2O_3$ _____ 10–25
    Percent $Eu_2O_3/RE_2O_3$ _____ 7–15

Strips substantially all of the rare earths from solvent.

The results that can be obtained in accordance with the present invention for a typical feed are summarized below in Table II.

TABLE II

| | Feed | Preg. Sol. 1 | Preg. Sol. 2 |
|---|---|---|---|
| Conc. $Eu_2O_3$, g./l. | 0.244 | 1.50 | 9.06 |
| Percent conc. $Eu_2O_3/RE_2O_3$, percent. | 0.19 | 3.1 | 7.7 |
| Factor increase based on feed to Circuits A and B: | | | |
| G./l. | | 6.0 | 5.4 |
| Percent conc. | | 11 | 3.2 |
| Factor increase based on feed to Circuit A: | | | |
| G./l. | | | 37 |
| Percent conc. | | | 41 |

The concentrations of europium in the product solutions are sufficiently high that these solutions can be treated by conventional chemical separation processes to separate the europium from the other rare earths present.

Heretofore, the europium has only been available in very small quantities. The invention described herein will provide europium in large quantities which will make it available for many industrial uses.

The process of the present invention is illustrated below by the following examples:

EXAMPLE 1

This example describes the selective solvent extraction of europium from an aqueous hydrochloric acid leach liquor solution containing other rare earths which was obtained by leaching a roasted bastnasite ore concentrate.

The leach liquor from the leach-thickening-filtration process had a pH of 0.5 to 0.8. The pH of this liquor was adjusted to about 1.2. This example compares the results obtained using the two stage interlocked solvent extraction system with and without using the recycle feature and shows that there is no reduction in the europium extracted from the feed leach liquor.

With reference to the figure of the drawing illustrating a schematic flow diagram of the process, the first liquid ion exchange circuit is labeled Circuit A and the second is Circuit B. The interlocking solution from Circuit B, line 8, is the recycle raffinate solution. Circuit A consists of six stages of extraction and four stages of stripping. Each mixer, M1–M6 and M11–M14 was 3 inches by 5.5 inches and the mixer volume was 460 cc. Each settler E1–E6 and S1–S4 was 4 inches by 12 inches. Circuit B consisted of two extraction stages and four stripping stages. The mixers N1 and N2 and N12–N14 were 2 inches by 4 inches and had a volume of 100 cc. The settlers E21 and E22 and S21 and S24 were 2 inches by 8 inches.

The feed solution to Circuit A, line 1, consisted of clarified leach liquor in Run 1 and in Run 2 clarified leach liquor plus the recycle raffinate, line 8, from Circuit B. The pregnant stripping solution, line 6, of Circuit A was adjusted in pH and fed to the Circuit B solvent extraction step. The product stream, line 14, was the pregnant stripping solution from Circuit B.

The same basic flowsheet as described above was used for all the examples.

The solvent used in the extraction stages of Circuits A and B was 10% DEHPA in 90% kerosene.

To start up the process the extraction settlers of Circuit A, E1 through E6 were partially filled with raffinate, line 4, from Circuit A from previous extractions. The stripping settlers S1 through S4 were partially filled with 2.5 N HCl stripping solution. All mixers and settlers in Circuit A were then filled with 10% DEHPA-90% kerosene solution. Circuit B extraction settlers E21 and E22 were partially filled with 0.1 N HCl solution and the stripping settlers S21 through S24 with 3.0 to 4.0 N HCl solution. All Circuit B mixers and settlers were then filled with 10% DEHPA-90% kerosene solution.

The results obtained from Run 1 without recycle show a europium extraction of 89.8% and a stripped organic solvent containing 0.015 g. $Eu_2O_3$/l.

When recycle solution was obtained from Circuit B, it was mixed with the leach liquor feed and fed to Circuit A in Run 2. The data are shown in Table III and the results in Run 2 should be compared with Run 1. A europium extraction of 90.2% was obtained in Run 2 with the recycle.

The summarized data for Circuit B from Run 2 of Circuit A at two different extraction levels of $Eu_2O_3$ are presented in Table IV. The circuit was operated to produce a recycle solution that had the same or slightly higher europium content than the leach liquor. The results of Run number 2a show that 60% of the europium and 31.2% of the total rare earths were extracted. Of the total rare earths in the pregnant stripping solution, 8.1% was $Eu_2O_3$ The stripping solution was increased in Run 2b to 4 N HCl in order to extract more europium and to increase the europium concentration in the pregnant solution. A europium extraction of 67.8% was obtained and the pregnant solution assayed 2.39 g. $Eu_2O_3/l$. as compared with an extraction of 60.0% and a pregnant solution that assayed 1.36 gm./l.

In the above example the europium is present as a water soluble chloride salt but for ease in analysis and because of the analytical procedures used is measured as the corresponding oxides.

The difference in the europium extracted in Runs 2a and 2b was primarily due to the differences in the stripping solution flow rate, i.e. 10.0 cc./min. in Run 2a as compared with 4.9 cc./min. in Run 2b.

TABLE III.—ORGANIC SOLVENT: 10% DEHPA, 90% KEROSENE

[Circuit A]

| Extraction | Run No. 1 | Run No. 2 |
|---|---|---|
| Feed: | | |
| G. $Eu_2O_3/l$ | 0.321 | [1] 0.331 |
| G. $CeO_2/l$ | 18.6 | 13.2 |
| G. $RE_2O_3/l$ | 178.5 | 130.2 |
| pH | 1.20 | 1.20 |
| Cc./min | 88.6 | 88.3 |
| Mixer temp., °C | 35 | 35 |
| Organic solvent stream B: | | |
| Cc./min | 175.4 | 176.2 |
| Raffinate, g. $Eu_2O_3/l$ | 0.032 | 0.022 |
| G. $CeO_2/l$ | 17.9 | 13.7 |
| G. $RE_2O_3/l$ | 167.5 | 127.5 |
| pH | 0.05 | |
| Percent extraction: | | |
| $EU_2O_3$ | 89.8 | [2] 90.2 |
| $CeO_2$ | 3.8 | |
| $RE_2O_3$ | 6.2 | |
| Stripping—Strip. sol'n.: | | |
| N HCl | 2.5 | 2.5 |
| Cc./min | 33.1 | 34.8 |
| Stripped organic solvent, g. $Eu_2O_3/l$ | 0.015 | 0.016 |
| Fat stripping sol'n.: | | |
| G. $Eu_2O_3/l$ | 0.895 | 0.836 |
| G. $CeO_2/l$ | 1.63 | 1.39 |
| G. $RE_2O_3/l$ | 23.7 | 21.9 |
| $Eu_2O_3/RE_2O_3$, percent | 3.78 | 3.82 |

[1] Feed: 28.0 liters of leach liquor containing 0.321 g. $Eu_2O_3/l.$, 178.5 g. $RE_2O_3/l$, plus 12.0 liters of recycle raffinate containing 0.382 g. $Eu_2O_3/l.$, 0.74 g. $CeO_2/l.$, 18.3 g. $RE_2O_3/l$.
[2] The percent extracted is based on the percent extracted from the leach liquor feed solution which contained 0.321 gm./l. $Eu_2O_3$.

TABLE IV.—ORGANIC SOLVENT: 10% DEHPA, 90% KEROSENE

[Circuit B]

| Extraction | Run No. 2a | Run No. 2b |
|---|---|---|
| Pregnant stripping sol'n., feed: | | |
| G. $Eu_2O_3/l$ | 0.955 | 0.990 |
| G. $CeO_2/l$ | 2.43 | 1.89 |
| G. $RE_2O_3/l$ | 26.6 | 26.6 |
| pH | 1.30 | 1.15 |
| Organic solvent: | | |
| Cc./min | 26.1 | 20.0 |
| Cc./min | 60.6 | 58.2 |
| Lean stripping sol'n., reaffinate, recycle: | | |
| G. $Eu_2O_3/l$ | 0.382 | 0.329 |
| G. $CeO_2/l$ | 0.74 | |
| G. $RE_2O_3/l$ | 18.3 | |
| Percent extraction: | | |
| $Eu_2O_3$ | 60.0 | 67.8 |
| $RE_2O_3$ | 31.2 | |
| Stripping—strip. sol'n.: | | |
| N HCl | 3.0–4.0 | 4.0 |
| Cc./min | 10.0 | 4.9 |
| Stripped organic solvent, g. $Eu_2O_3/l$ | Nil, 0.0008 | 0.004 |
| Fat stripping solution, product: | | |
| G. $Eu_2O_3/l$ | 1.36 | 2.39 |
| G. $CeO_2/l$ | 0.43 | |
| G. $RE_2O_3/l$ | 16.8 | |
| $Eu_2O_3/RE_2O_3$, percent | 18.1 | |

In this example an overall europium recovery of 90.2% was obtained with the two stage interlocked solvent system.

By carrying out the solvent extraction step in accordance with the present invention, the following improvements are noted. The two circuit extraction in the example comparing the pregnant solution of Run 2a with the pregnant solution of Run 1 shows the following:

Run 1 resulted in an increase in grams per liter of $Eu_2O_3$ from 0.321 to 0.895 gram per liter and a percent concentration increase relative to other rare earths from 0.18% to 3.78% but only in a $Eu_2O_3$ recovery of about 89.8%. The two step process of the present invention using the Circuit A and Circuit B extraction steps in conjunction with the recycle of raffinate feed solution of Circuit B extraction to the feed of Circuit A extraction results in an increase of $Eu_2O_3$ concentration in grams per liter of 0.321 gram per liter to 1.36 gram per liter and in increase in percent concentration of $Eu_2O_3$ relative to $RE_2O_3$ from 0.18% to 8.1% with an overall recovery of $Eu_2O_3$ of 90.2%.

The most important thing illustrated by the date was that recycling the raffinate from the Circuit B extraction step did not reduce the percent of europium, based of europium in the leach liquor feed that was extracted in the Circuit A extraction step.

This was unexpected because it had been believed that increasing the concentration of $Eu_2O_3$ in the feed to the Circuit A extraction would result in a reduction rather than a slight increase in the percent of $Eu_2O_3$ extracted and would result in a net loss of recovery of $Eu_2O_3$ to the process.

It was further unexpectedly found that by using the recycle step the Circuit B extraction step could be carried out with about ⅓ of the extraction stages used in the first extract step of Circuit A and obtain an increase in concentration of $Eu_2O_3$ in grams per liter and in percent of $Eu_2O_3/RE_2O_3$ of the same magnitude as obtained in the extraction step of Circuit A.

The Circuit B extraction step further increases the percent concentration of $Eu_2O_3$ from 3.78% in Run 1, Circuit A to 8.1% in Run 2a and from 0.895 gram per liter of $Eu_2O_3$ to 1.36 gram per liter of $Eu_2O_3$, however, but for recycling the raffinate from Circuit B extraction to the Circuit A feed this step would result in about a 40% loss in net yield of $Eu_2O_3$ to the process, since the Circuit B extraction only extracts about 60.0% of the $Eu_2O_3$ present (see Run 2a).

EXAMPLE 2

In this example, the solvent in Circuit A was removed and replaced with a 13% DEHPA-87% kerosene solution (13% DEHPA=0.411 M). The solvent in Circuit B was replaced with a 20% DEHPA-80% kerosene solution (20% DEHPA=0.632 M). These changes resulted in increasing overall europium recovery and producing a pregnant stripping solution from Circuit B having a higher concentration of $Eu_2O_3$ than in Example 1. The leach liquor feed was obtained by HCl leaching of a roasted bastnasite ore concentrate obtained from Mountain Pass, Calif. The leach liquor feed was adjusted in concentration by adding water to give a feed solution to the extraction circuit of 125 to 130 g. $RE_2O_3/l$.

The two step solvent extract process was carried out folowing the same procedure as in Example 1. Comparing Runs 1 and 2 of Circuit A reported in Table V (without and with recycle,) respectively, the results show that percent $Eu_2O_3$ extraction was essentially the same in either case. The percent $Eu_2O_3$ extracted was 97.8% and 97.9% respectively, based on the amount of europium in the leach liquor portion of the feed. However, and quite unexpectedly, the recycle had a dramatic effect in reducing the amount of $RE_2O_3$ extracted from 8.0% to 2.8%. Therefore, the recycle step had a very advantageous effect of reducing $RE_2O_3$ extraction in Circuit A, and thereby substantially increasing the present concentration of $Eu_2O_3$ relative to $RE_2O_3$. It should be kept in mind that in addition to the amount of europium extracted from leach liquor portion of the feed that substantially all of the europium from the recycle portion of the feed is also extracted in Circuit A. This fact is highlighted by the small amount of europium in the feed raffinate to Circuit A.

Although flow rates and stripping solution HCl concentration were altered during the initial operation of Circuit B, the average results are presented in Table VI. The results show that 70.1% of the europium and 26.4% of the total rare earths were extracted in Circuit B and produced a pregnant stripping solution product stream which contained 9.06 g. $Eu_2O_3$/l. and 117.6 g. $RE_2O_3$/l., and an $Eu_2O_3$ percent concentration relative to $RE_2O_3$ of 7.7%.

This example brings out the completely unexpected finding that when the recycle raffinate stream from the Circuit B extraction is added to the leach liquor feed to the Circuit A extraction that there is no loss in the percentage of europium extracted based on the europium in the leach liquor feed and that there is a substantial reduction in the amount of other rare earths extracted.

TABLE V.—ORGANIC SOLVENT: 13% DEHPA, 87% KEROSENE STRIPPING TEMPERATURE 40°–45° C.

[Circuit A]

| Extraction | Run No. 1 | Run No. 2 |
|---|---|---|
| Feed sol'n.: | | |
| Leach liquor, liter | 95.9 | 82.6 |
| G. $Eu_2O_3$/l | 0.272 | 0.251 |
| G. $RE_2O_3$/l | 140.7 | 127.5 |
| pH | 1.40 | 1.25 |
| Recycle, liter | None | 13.6 |
| Raffinate from aqueous feed sol'n. from Circuit B extraction: | | |
| G. $Eu_2O_3$/l | | 0.531 |
| G. $RE_2O_3$/l | | 52.0 |
| pH | | 1.31 |
| Total feed to Circuit A extraction, cc./min | 99.9 | [1] 100.2 |
| Organic solvent, cc./min | 136.4 | 134.7 |
| Ret. time/mixer, min | 1.95 | 1.96 |
| Stripped raffinate sol'n.: | | |
| Liter | 95.9 | 96.2 |
| G. $Eu_2O_3$/l | 0.006 | 0.0045 |
| G. $RE_2O_3$/l | 129.5 | 106.4 |
| pH | 0.11 | 0.19 |
| Percent extraction: | | |
| $Eu_2O_3$ | 97.8 | [2] 97.9 |
| $RE_2O_3$ | 8.0 | 2.8 |
| Stripping: | | |
| Stripping soln.: | | |
| N HCl | 3.0 | 3.0 |
| Cc./min | 16.0 | 14.3 |
| Stripped organic solvent, g. $Eu_2O_3$/l | Nil | Nil |
| Pregnant Stripping Soln.: | | |
| Liter | 15.4 | 13.7 |
| G. $Eu_2O_3$/l | 1.35 | 1.84 |
| G. $RE_2O_3$/l | 54.9 | 68.5 |

[1] Contains leach liquor feed and recycle.
[2] Based on europium in leach liquor portion of feed.

TABLE VI.— ORGANIC SOLVENT: 20% DEHPA, 80% KEROSENE; STRIPPING TEMPERATURE: 40–45° C.

Circuit B

Extraction.—Pregnant stripping solution from Circuit A (feed to Circuit B):

Feed—
  G. $Eu_2O_3$/l. _____ 1.68
  G. $RE_2O_3$/l. _____ 64.5
  pH _____ 1.13
  Cc./min. _____ 23.9
Organic solvent, cc./min. _____ 36.5
Ret. time/mixer, min. _____ 1.66
Recycle—
  G. $Eu_2O_3$/l. _____ 0.503
  G. $RE_2O_3$/l. _____ 47.5
  pH _____ 0.20
Percent extraction—
  $Eu_2O_3$ _____ 70.1
  $RE_2O_3$ _____ 26.4
Stripping:
  Strip. sol'n.—
  N HCl _____ 4.0–5.0
  Cc./min. _____ 3.3
  Pregnant stripping sol'n. stream product—
  G. $Eu_2O_3$/l. _____ 9.06

G. $RE_2O_3$/l. _____ 117.6
  $Eu_2O_3$/$RE_2O_3$, percent _____ 7.7

The above data shows that with solvent of 13% DEHPA-87% kerosene, solution in Circuit A, europium recovery approaching 98% can be obtained.

The advantages effect of recycling the raffinate feed from the Circuit B extraction step is brought out in this example. Comparing Runs 1 and 2, it is seen that at about the same percent extraction of $Eu_2O_3$, i.e., about 97.9%, that the percent $RE_2O_3$ extracted was reduced from 8.0% (without recycle) to 2.8% with recycle, and the grams per liter of $Eu_2O_3$ in the stripping solution increased from 1.35 g./l. to 1.84 g./l.

The pregnant solution product of the Circuit B extraction contains 9.06 g./l. of $Eu_2O_3$ and 7.7% of $Eu_2O_3$ relative to $RE_2O_3$.

Depending on the source of the ore used to prepare the leach liquor feed iron ions may be present in a sufficient amount to cause process difficulties in carrying out the process. The iron may easily be removed by precipitating, the iron as ferric hydroxide from the pregnant stripping solution from the Circuit A extraction or from the leach liquor feed solution in a conventional manner.

EXAMPLE 3

The example was carried out to maximize europium recovery in grams per liter concentration from a leach liquor concentrate of rare earths obtained from bastnasite ore from Mountain Pass, Calif.

Circuit A was operated as in the previous examples, except that during the latter part of the runs tributyl phosphate (TBP) was added to the organic solvent to improve phase separation and to improve europium recovery.

A 5 N HCl strip solution was used in order to obtain a high europium concentration.

Circuit A.—The organic solvent contained 13% DEHPA, 3% TBP and 84% kerosene. Europium recovery, shown in Table VII was 96.7% at a retention time of 1.27 minutes per extraction mixer and 97.4% at 1.92 minutes.

The Circuit B extraction was carried out to produce a pregnant stripping solution of about 12.5 l and 23.3 grams/liter of europium measured as europium oxide.

The results are shown in Table VII.

TABLE VII.—ORGANIC SOLVENT: 13% DEHPA, 3% TBP, 84% KEROSENE STRIPPING SOLUTION: 3 N HCl, 40–45° C.

[Circuit A]

| Extraction | 1 | 2 |
|---|---|---|
| Leach liquor, l | 570.1 | 82.9 |
| Feed solution: | | |
| G. $Eu_2O_3$/l | 0.247 | 0.270 |
| G. $RE_2O_3$/l | 128.5 | 134.3 |
| Recycle raffinate stripping solution: | | |
| Liter | 95.85 | 13.9 |
| G. $Eu_2O_3$/l | 0.313 | 0.288 |
| G. $RE_2O_3$/l | 46.6 | 46.1 |
| Total feed, to Circuit A extraction: | | |
| Cc./min | 150 | 100 |
| ph | 1.2 | 1.2 |
| Organic solvent, cc./min | 211 | 140 |
| Ret. time/mixer, min | 1.27 | 1.92 |
| Stripped raffinate: | | |
| Liter | 65.95 | 96.8 |
| G. $Eu_2O_3$/l | 0.007 | 0.006 |
| G. $RE_2O_3$/l | 107.1 | 113.0 |
| Percent extraction: | | |
| $Eu_2O_3$ | 96.7 | 97.4 |
| $RE_2O_3$ | 2.64 | 1.75 |
| Stripping: | | |
| Strip. Sol'n.: | | |
| Liter | 95.88 | 14.55 |
| Cc./min | 21.2 | 14.9 |
| Pregnant Stripping Sol'n.: | | |
| Liter | 95.88 | 14.55 |
| G. $Eu_2O_3$/l | 1.49 | 1.76 |
| G. $RE_2O_3$/l | 59.1 | 72.0 |

TABLE VIII.—ORGANIC, 20% DEHPA 80% KEROSENE; STRIPPING SOLUTION, 5 N HCl, 4–045° C.
[Circuit B]

| Extraction | 1 | 2 |
|---|---|---|
| Stripping solution stream C. (pregnant) feed: | | |
| Liter | 39.8 | 31.5 |
| Cc./min | 19.3 | 29.5 |
| ph | 1.1 | 1.1 |
| G. Eu$_2$O$_3$/l | 1.62 | 1.78 |
| G. RE$_2$O$_3$/l | 68.5 | 68.9 |
| Organic solvent, cc./min | 20 | 35.8 |
| Ret. time/mixer, min | 2.54 | 1.53 |
| Raffinate recycle: | | |
| Liter | 38.9 | 31.5 |
| Eu$_2$O$_3$/l | 0.298 | 0.436 |
| G. RE$_2$O$_3$/l | 52.9 | 54.5 |
| Percent extraction: | | |
| Eu$_2$O$_3$ | 81.6 | 75.5 |
| RE$_2$O$_3$ | 22.8 | 20.9 |
| Stripping: | | |
| Strip. Sol'n. | | |
| Liter | 3.758 | 1.802 |
| Cc./min | 1.82 | 1.69 |
| Pregnant Strip. Sol'n.: | | |
| Liter | 3.758 | 1.802 |
| G. Eu$_2$O$_3$/l | 12.51 | 23.30 |
| G. RE$_2$O$_3$/l | 151.8 | 251.4 |
| Eu$_2$O$_3$/RE$_2$O$_3$, percent | 8.24 | 9.27 |

Somewhat higher extraction could be obtained at longer retention times. The TBP helped to increase phase settlement time in the Circuit A extraction circuit.

The results obtained in hte above examples clearly show that europium can be recovered efficiently, economically and in large quantities by using the two circuit interlock solvent extraction systems of the present invention. By this interlock system, a unique operation is possible whereby a final concentrate solution of rare earths in which the europium content is 6–15% is produced, and overall europium recovery based on the amount of europium in a concentrated leach liquor feed, can be up to 98% or more. The process of the present invention has been able to utilize feed solutions containing as little as 0.15% europium oxide, e.g. 0.25 g./l. to obtain a concentrated aqueous solution product containing up to about 23.3 grams per liter of europium oxide.

The process of the present invention has for the first time allowed recovery of europium oxide in high concentrations at which it can be treated by conventional chemical separation means to obtain substantially pure europium. The procedure of the present invention is characterized by economic operation, high degree of selectivity of europium oxide, high overall yield of europium oxide and inexpensive apparatus and procedures for extraction and stripping.

Further, the increase in concentration of europium oxide relative to other rare earth oxides as obtained by the present process is equally, if not more important than the increase in concentration of europium oxide in grams per liter since the product solution can be evaporated to increase the concentration of the rare earth elements in grams per liter.

The process has been described and illustrated with reference to the recovery of europium from rare earth containing concentrates. It is pointed out, however, that the process of the present invention has broad application to the separation of a rare earth element from another rare earth element, of an element from several elements and of one group of elements from a second group of elements.

The primary requirement is that the solvent selected to carry out the process exhibits a characteristic solvent extraction preference for the rare earth elements desired to be recovered or concentrated.

Obviously, however, the materials desired to be recovered can be those left behind by extracting the materials not wanted.

The particular solvent selected will depend on the separation to be carried out.

For example, rare earth elements in the yttrium and cerium groups can be separated individually or by selected groups whereby the highest atomic weight elements are separated from the lowest atomic weight elements.

Suitable solvents are the alkyl phosphoric acids and alkyl amine solvents. Alkyl amine solvents such as Primene JMT which comprise a mixture of isomers of tertiary alkyl amines having 18 to 21 carbon atoms can be used.

Obvious changes may be made in the procedure described without departing from the scope of the invention. It is intended that the above description of the invention is illustrative and not to be interpreted as limiting in any sense. The scope of the invention should be interpreted in accordance with the following claims.

What is claimed is:

1. A process for selectively extracting europium values from a first aqueous feed solution containing europium and other rare earth values which comprises feeding said solution having a pH of 1.0 to 4 to a first solvent extraction circuit, and (1) contacting said first aqueous feed solution with an organic solvent which is an alkyl phosphoric acid or an alkyl amine and which is immiscible with water to selectively extract 75–99% of europium values, separating said first aqueous feed solution phase substantially devoid in europium values from said solvent phase enriched in europium values; (2) contacting said separated solvent phase enriched in europium values with a first aqueous inorganic mineral acid stripping solution of 1.0 to 5.0 N, stripping substantially all of said europium values from said organic solvent into said stripping solution, said stripping solution enriched in europium values comprising a second aqueous feed solvent to a second solvent extraction circuit; (3) contacting said second aqueous feed solution at pH of 1.0 to 4.0 with an organic alkyl phosphate solvent which is immiscible with water to selectively extract 40–80% of the europium values and a minor portion of other rare earth values, selectively extracting said europium values, separating an aqueous raffinate phase depleted in europium values but containing a significant amount of europium values and an organic solvent phase enriched in europium values; (4) recycling said aqueous raffinate phase to said first aqueous feed solution fed to said first solvent extraction circuit; (5) contacting said organic solvent phase enriched in europium values with a second aqueous inorganic mineral acid stripping solution of 2.0 to 6.0 N to strip substantially all of said europium values from said solvent into said aqueous stripping solution, separating an aqueous stripping solution phase from an organic solvent phase, and recovering said second aqueous stripping solution substantially enriched in europium values.

2. A process according to claim 1 wherein the contacting step (1) is carried out countercurrently in at least two extraction stages and wherein said organic solvent is di-(2-ethylhexyl)phosphoric acid; wherein the contacting step (2) is carried out countercurrently and wherein said acid is hydrochloric acid; wherein the contacting step (3) is carried out countercurrently and wherein said solvent is di-(2-ethylhexyl)phosphoric acid; and wherein the contacting step (5) is carried out countercurrently and wherein said acid is hydrochloric acid.

References Cited

UNITED STATES PATENTS 2,860,031  11/1958  Grinstead _____ 23—23 X
2,955,913  10/1960  Peppard et al. _____ 23—23
3,077,378  2/1963  Peppard et al. _____ 23—23

OTHER REFERENCES

Peppard et al.: "Journal of Physical Chemistry," vol. 57, March 1953, pp. 294–301.

Peppard et al.: "Journal of Inorganic and Nuclear Chemistry," vol. 24, 1962, pp. 429–439.

HERBERT T. CARTER, Primary Examiner

U.S. Cl. X.R.

23—23, 24, 183